United States Patent [19]

Hass

[11] Patent Number: 5,050,062
[45] Date of Patent: * Sep. 17, 1991

[54] TEMPERATURE CONTROLLED FLUID SYSTEM

[76] Inventor: David N. Hass, R.D. #5, Box 223, Wynantskill, N.Y. 12198

[ * ] Notice: The portion of the term of this patent subsequent to Jun. 5, 2007 has been disclaimed.

[21] Appl. No.: 307,369

[22] Filed: Feb. 6, 1989

[51] Int. Cl.$^5$ .............................................. G05D 23/30
[52] U.S. Cl. .................................... 364/152; 364/510; 236/12.12; 137/624.12
[58] Field of Search ................... 364/152, 510; 236/94, 236/12.11, 12.12; 137/624.11, 624.12

[56] References Cited

U.S. PATENT DOCUMENTS

| | | | |
|---|---|---|---|
| 3,974,434 | 8/1976 | Yablonski | 318/696 |
| 4,322,031 | 3/1982 | Gehlert | 236/12 R |
| 4,359,186 | 11/1982 | Kiendl | 236/12 A |
| 4,420,811 | 12/1983 | Tarnay et al. | 364/510 |
| 4,499,920 | 2/1985 | Steffan et al. | 137/624.15 |
| 4,629,968 | 12/1986 | Butts et al. | 322/29 |
| 4,682,728 | 7/1987 | Oudenhoven et al. | 236/12.12 |
| 4,696,428 | 9/1987 | Shakalis | 236/12.12 |

Primary Examiner—Jerry Smith
Assistant Examiner—Paul Gordon
Attorney, Agent, or Firm—Robert J. Jarvis

[57] ABSTRACT

A temperature controlled fluid system includes hot and cold fluid supply connections and hot and cold fluid valves for controlling the flow of the hot and cold fluids into the system. Each valve has a valve seat and a valve member which is moveable with respect to the valve seat. First and second stepper motors are connected to the valves in such a manner that actuation of the respective stepper motor moves the corresponding valve member in relationship to the associated valve seat. The system includes a mixer for promoting mixing of the hot and cold fluids into a fluid mixture which has a substantially uniform temperature throughout a given cross section of the mixed fluid flow. Also included in the inventive system is a device for generating an electrical signal corresponding to the actual temperature of the mixed fluid, and digital processing circuitry for computing an error value between the actual fluid temperature and a preselected value therefor and then applying a feedback control algorithm to the error value to generate a feedback control signal for the hot and cold fluid valves. A logic decoder is connected between the processing circuitry and the stepper motors to selectively power the motors in response to the feedback signal. The invention may further include an input device for selecting the desired temperature and flow rate of the mixed fluid, as well as device for displaying actual and selected system parameters.

30 Claims, 4 Drawing Sheets

TEMPERATURE CONTROLLED FLUID SYSTEM

RELATED APPLICATION

This patent application is related to U.S. application Ser. No. 837,500, filed Mar. 7, 1986 in the name of the present inventor, and now issued as U.S. Pat. No. 4,931,938.

FIELD OF THE INVENTION

This invention relates to a system for automatically controlling the flow of hot and cold fluids so as to maintain the mixed fluids at a preselected temperature. More particularly, the invention relates to digitally implementing a feedback control algorithm which acts in conjunction with the measured fluid temperature to control the individual flow rates of the hot and cold fluids, so as to maintain the temperature of the fluid mixture at the desired value. The inventive system thoroughly mixes the hot and cold fluids upstream of the location where the temperature of the fluid mixture is monitored, in order to provide rapid and accurate control of the fluid mixture temperature in response to disturbances in the temperatures and flow rates of the hot and cold fluid supplies.

BACKGROUND OF THE INVENTION

There are a number of applications for which the temperature of the fluid being used in a particular process must be maintained within very close tolerance of a predetermined value. For example, in photographic film developing, variations in the temperature of the water used in the developing process adversely affect the quality of the finished product. The same is true for a large number of other industrial processes. In still other applications, controllable variation of the fluid temperature is required. For example, in some rehabilitative procedures for persons with bone fractures, the injured limb is alternately bathed with hot and cold water. For such an application, a closely regulated pattern of fluid temperature as a function of time is desirable. A common requirement for all of these applications is automatic control of the fluid temperature such that the desired temperature is maintained regardless of fluctuations in the hot and cold fluids which are supplied to the system.

A number of arrangements have been proposed in the past for mixing hot and cold fluids together to produce a mixed fluid having a preselected temperature. Many of those proposed systems employ analog circuitry to provide the feedback control algorithm. For example, U.S. Pat. No. 4,359,186 issued to Kiendel discloses a mixing valve arrangement which utilizes motor driven valves to supply hot and cold water to a mixing chamber. The temperature of the water in the mixing chamber is measured and is used, along with the flow rate of fluid moving through the mixing chamber, in an analog control circuit which provides signals for controlling the valve motors in response to temperature variations. The type of temperature control system disclosed by Kiendel suffers from the inflexibility which is typical of analog control circuits. In order to adjust the control constants or to change the control algorithm, circuit components must be physically replaced or adjusted.

Other practitioners have apparently recognized the usefulness of a digital processor such as a microcomputer in implementing the control algorithm. For example, U.S. Pat. No. 4,420,811 issued to Tarnay et al discloses a water temperature control system for which the feedback control algorithm is preferably embodied in a microcomputer. However, the patent to Tarnay et al is apparently not particularly concerned with rapid and accurate system response. The valve arrangement, the configuration of the water discharge channel, and the temperature sensor device taught by Tarnay et al all appear to create inaccuracies and slowness in the system response time which would be difficult to solve using the arrangement disclosed in their patent.

U.S. Pat. application Ser. No. 837,500, filed Mar. 7, 1986 by the present inventor, and now issued as U.S. Pat. No. 4,931,938, discloses a microcomputer controlled faucet which rapidly and accurately controls hot and cold supply valves so as to maintain the temperature of the water being discharged from the faucet within a very small margin of error of the preselected temperature. The system disclosed utilizes a mixing connection which is configured to promote even mixing of the hot and cold fluids, and also a fast response temperature sensor placed in a location that provides accurate sensing of the mixed fluid temperature. As shown by the sample operational results included in that patent application, the microcomputer controlled system disclosed therein provides excellent control of the fluid mixture temperature, even when the hot and cold fluid supplies vary significantly in temperature and pressure.

The present inventor has unexpectedly discovered that, for some applications, the fluid temperature control system is further improved by actively mixing the hot and cold fluids together before measuring the temperature of the fluid mixture. By appropriately doing so, the control system of the present invention provides a control temperature tolerance of plus or minus 0.2 degrees Fahrenheit.

In accordance with the foregoing, it is an object of the present invention to provide a fluid system which automatically maintains the temperature of the fluid mixture discharged from the system at a preselected value, within predetermined limits.

It is a further object of the present invention to provide a temperature control system which accurately and rapidly adjusts the flow rates of hot and cold fluids into the system so as to maintain the temperature of the mixed fluids within a very close tolerance of the desired temperature.

It is yet another object of the present invention to provide a fluid control system for which the feedback algorithm can easily be changed.

It is also an object of this invention to provide a temperature controlled fluid system which is reliable in operation, rugged in construction, and economical to manufacture.

SUMMARY OF THE INVENTION

In accordance with the present invention, a temperature controlled fluid system comprises hot and cold fluid supply connections for supplying hot and cold fluids to the system, and hot and cold fluid valves connected to the respective supply connections. Each valve has a valve seat and a valve member which is movable with respect to the valve seat so as to control a flow of fluid through the valve. Stepper motors are connected to the valves in such a manner that actuation of the respective stepper motor moves the corresponding valve member in relationship to the associated valve seat. Connected to the hot and cold fluid valves is a means for receiving the flow of hot and cold fluids and mixing them together into a fluid mixture having a substantially uniform temperature throughout a given cross section of the mixed fluid flow. The mixing means is, in turn, connected to an outlet connection for discharging the mixed fluid from the system. The invention control system also includes means for generating an electrical signal corresponding to the actual temperature of the mixed fluid, and digital processing means for computing an error value between the actual temperature of the fluid mixture and a selected temperature therefor. The digital processing means applies a feedback control algorithm to the error value and generates a feedback control signal for controlling the fluid flow through the hot and cold fluid valves. Also connected to the digital processing means is a logic means for receiving the feedback control signal and for controlling the stepper motors in response to the control signal. Actuation of the stepper motors moves the hot and cold valve members and thereby adjusts the flow rates of fluid through said valves, so as to cause the actual temperature of the mixed fluid to approach the selected temperature.

The digital processing means of the present invention preferably comprises a microcomputer. The temperature signal generating means may conveniently comprise a temperature sensor which generates an analog signal corresponding to the actual temperature of the fluid mixture, and an analog-to-digital converter which changes the analog signal into a digital temperature signal. In one embodiment, the mixing means directs the flow of hot and cold fluids so as to blend them into a substantially homogeneous mixture. The fluid system of the present invention may further comprise an input means for selecting the desired temperature and flow rate of the mixed fluid, as well as means for displaying the selected temperature and flow rate values and also the actual temperature of the fluid mixture.

BRIEF DESCRIPTION OF THE DRAWINGS

The subject matter which is regarded as the invention is particularly pointed out and distinctly claimed in the concluding portion of the specification. The invention itself, however, both as to its organization and its method of practice, together with further objects and advantages thereof, may best be understood by reference to the following description taken in conjunction with the accompanying drawings, in which:

DETAILED DESCRIPTION OF THE PREFERRED EMBODIMENTS

Figure 1:
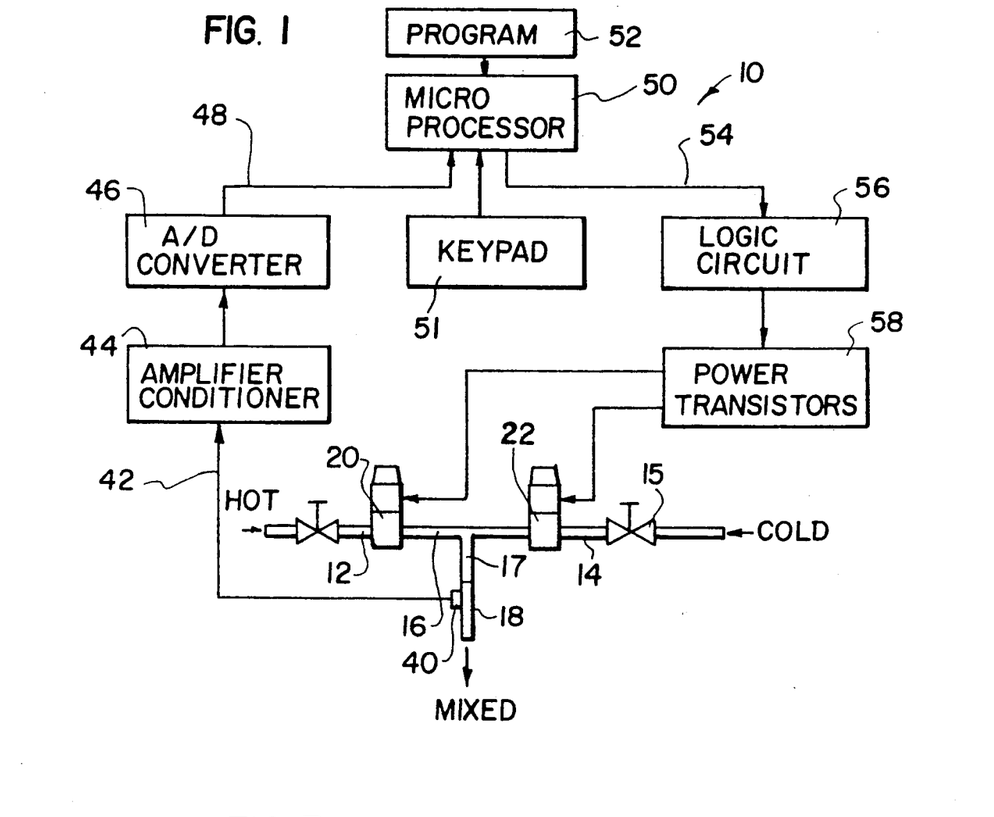
FIG. 1 is a block diagram schematically illustrating a temperature controlled fluid system in accordance with the present invention.

The fluid system of the present invention utilizes motor driven valves which are controlled by a digital processor in accordance with a feedback control algorithm so that the resulting regulated flow of hot and cold fluids produces a mixed fluid having an accurately controlled temperature. As is schematically illustrated in FIG. 1, such a system comprises hot fluid supply connection 12 and cold fluid supply connection 14, for supplying hot and cold fluids to system 10. Hot and cold supply connections 12 and 14 are connected, respectively, to hot and cold fluid valves 20 and 22. Valves 20 and 22 each have a valve seat and a valve member which is moveable with respect to the valve seat in order to control a flow of fluid through each respective valve. First and second stepper motors are connected, respectively, to hot and cold fluid valves 20 and 22 for moving the respective valve members in relationship to their associated valve seats. Connected to and located between hot and cold fluid valves 20 and 22 is means 17 for receiving the flow of hot and cold fluids from valves 20 and 22 and mixing the fluids together into a fluid mixture which has a substantially uniform temperature for all radial locations within a given cross section of the mixed fluid flow. Mixing means 17 is, in turn, connected to outlet connection 18 for discharging the mixed fluid from system 10.

System 10 also comprises means for generating an electrical signal corresponding to the actual temperature of the mixed fluid discharged from outlet connection 18, and digital processing means connected to the temperature signal generating means for computing an error value between the actual fluid temperature and a selected temperature for the fluid mixture. The digital processing means is further configured to apply a digitally implemented feedback control algorithm to the error value in order to generate a feedback control signal which is utilized to control the flow of fluids through hot and cold valves 20 and 22. In the embodiment illustrated in FIG. 1, the digital processing means comprises a microcomputer which is designated as microprocessor 50. The temperature signal generating means comprises temperature sensor 40 connected to outlet connection 18, and analog-to-digital conversion means connected to temperature sensor 40. Sensor 40 generates an analog signal corresponding to the actual temperature of the mixed fluid in outlet connection 18. The analog temperature signal is transmitted over line 42 to amplifier and conditioner circuit 44. Once the analog signal has been suitably amplified and conditioned, it is provided to analog-to-digital converter 46, where it is converted into a digital temperature signal corresponding to the actual temperature of the mixed fluid. The digitized signal from converter 46 is supplied over line 48 to microprocessor 50. Microprocessor 50 is programmed to use the digitized temperature signal in accordance with the feedback control algorithm designated in program 52 in order to generate an appropriate control signal for valves 20 and 22. The control signal is supplied over line 54 to logic circuit 56, where it is decoded into appropriate control signals which are applied to power transistors 58 in order to selectively power the stepper motors for valves 20 and 22. Logic circuit 56 and power transistors 58 together form a logic means for receiving the feedback control signal from the digital processor and for controlling the stepper motors in response to the control signal. The stepper motors, in turn, move the hot and cold valve members so as to cause the actual temperature of the mixed fluid to approach the preselected temperature.

In one embodiment, program 52 includes a selected set point temperature. Alternatively, as is explained in more detail hereinbelow, the selected temperature may be provided to microprocessor 50 by means of keypad 51. In either case, when the actual temperature measured by temperature sensor 40 is different from the set point temperature, the temperature error is used in an appropriate feedback control algorithm to provide the required feedback signal on line 54. By using a programmable digital processor, such as microprocessor 50, to digitally implement the feedback control algorithm, virtually any type of feedback control can be employed. Furthermore, the type of feedback algorithm utilized can be changed, or the control coefficients for a particular type of feedback system can be adjusted, simply by reprogramming microprocessor 50. There is no need to physically replace or adjust any circuit devices. The feedback algorithm may be chosen to control valves 20 and 22 in a proportional, proportional plus integral, proportional plus integral plus derivative, feed forward, or any other suitable manner. For the system shown in FIG. 1, a digital implementation of a proportional plus integral algorithm provides an excellent control system. By using the history of the temperature errors as well as the current error when deciding how to adjust the hot and cold fluid valves, the microcomputer provides a smooth system response that results in a stable, consistent fluid output temperature despite irregularities in the hot and cold fluid supplies. Especially when the actual fluid temperature is sampled a number of times per second, very little underdamping or overdamping is present in the overall system response.

As mentioned earlier, when system 10 includes a user programmable digital processor, the feedback control coefficients for a particular feedback algorithm may easily be adjusted to optimize the system response. In such an embodiment, microprocessor 50 and keypad 51 are further disposed so that the feedback coefficients for the feedback control algorithm are adjustable via keypad 51. By monitoring the system response as the feedback coefficients are changed, an operator can effectively "tune" the control circuit to provide an optimum response for a particular set of circumstances. As an alternative to employing keypad 51 to change the feedback coefficients, the same result could be achieved by using a remote computer connected to microprocessor 50 via an interface cable.

As an example of this type of adjustment of the feedback coefficients, the present inventor has found empirically that a useful feedback control signal is one that satisfies the equation $$M = Kp(E + Ki \Sigma_b{}^N E)$$

where M is the feedback signal or amount of correction for the valves, E is the measured temperature error, Kp is defined to be the selected temperature divided by 100, and Ki is defined as the selected temperature divided by the flow rate of the mixed fluid. The measured temperature error E can be further defined as the actual temperature minus the selected temperature.

Yet another possibility with regard to tuning of feedback coefficients is for system 10 to itself automatically tune its feedback coefficients to optimize the control system. The inventive fluid system may further comprise means for monitoring the difference between the actual temperature of the mixed fluid and the selected temperature therefor, and for adjusting the feedback coefficients of the control algorithm so as to minimize the difference between the actual and selected temperatures while avoiding system responses which are excessively underdamped or overdamped.

Figure 6:
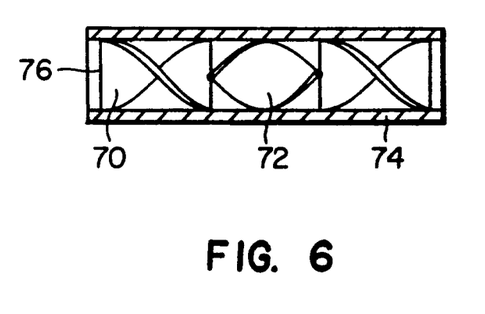
FIG. 6 is a side elevation, cross-sectional view schematically illustrating one embodiment of a fluid mixer in accordance with the present invention.

For the above described feedback system to provide a fast and accurate response to changes in the hot and cold fluid supplies, an accurate indication of the actual temperature of the mixed fluid being discharged from the system is required. To obtain an accurate temperature reading from temperature sensor 40, the hot and cold fluids must be blended into a fluid mixture having a substantially uniform radial temperature gradient upstream from the location of temperature sensor 40. Otherwise, it is not possible in some applications to maintain the fluid temperature within a tight tolerance of the selected temperature. While a uniform temperature fluid mixture could be obtained by letting the hot and cold fluids flow through a relatively long length of pipe, doing so requires the temperature sensor to be at a correspondingly long distance from the hot and cold fluid valves, thereby introducing an unacceptably long time lag into the control system. The present inventor has found that both requirements can be met by incorporating a static mixer into fluid system 10 at a location between fluid valves 20 and 22 and temperature sensor 40. For this embodiment, mixing means 17 comprises means for directing the flow of hot and cold fluids so as to blend them into a substantially homogeneous mixture. As is schematically illustrated in FIG. 6, the fluid directing means may comprise one or more stationary mixer elements 70 and 72 disposed in the flow path of the hot and cold fluids. In one particularly effective embodiment, mixer elements 70 and 72 are generally helically shaped. In the embodiment shown, a plurality of mixer elements 70 and 72 are disposed end-to-end in pipe 74 which connects hot and cold fluid valves 20 and 22 to outlet connection 18. Preferably, mixer elements 70 and 72 are further disposed so that the helices formed by adjoining mixer elements are oriented in opposite rotational directions. By alternating the helix orientations, fluid flow through the mixer undergoes further reversal of direction and thereby contributes to the mixing efficiency. For maximum effect, the orientation of adjoining elements should be radially displaced by 90 degrees. Additionally, the first mixer element encountered by the fluid flow should be disposed so that edge 76 of mixer element 70 initially divides the separate fluid flows from valves 20 and 22 through pipes 16 into two streams. For mixing elements 70 and 72 to serve their purpose, they must be restrained from rotational movement with respect to the interior of pipe 74. Any conventionally available means may be employed to so secure elements 70 and 72, including press fitting mixing elements 70 and 72 inside pipe 74 and welding or soldering elements 70 and 72 to pipe 74. When mixing elements 70 and 72 are employed in the manner described above, the hot and cold fluids are blended into a substantially homogeneous fluid within a distance equal to approximately four diameters of pipe 74. The resulting mixed fluid has substantially the same temperature at all radial locations within a particular cross section of the fluid flow path. Mixer elements of the type shown in FIG. 6 are readily available from Chemineer Kenics of North Andover, Massachusetts. For some applications, mixing of the hot and cold fluids may be still further improved by disposing mixing means 17 so that the flow path lengths of the hot and cold fluids, between the locations of hot and cold valves 20 and 22, respectively, and the location of outlet connection 18, are substantially equal.

Figure 2:
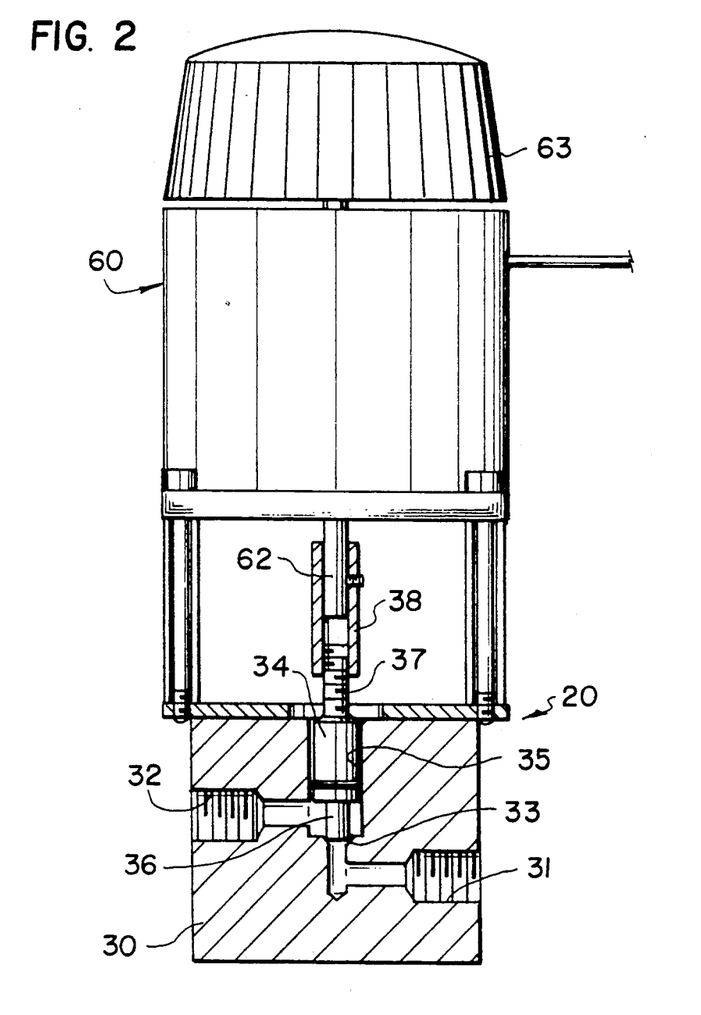
FIG. 2 is a side elevation view in partial cross section of one embodiment of a valve and stepper motor arrangement which may be utilized in the present invention.

FIG. 2 schematically illustrates one embodiment of a valve and stepper motor arrangement which may be utilized in the present invention. Hot and cold fluid valves 20 and 22 are identical in function and structure. Accordingly, only valve 20 is shown in FIG. 2. Valve 20 includes valve housing 30 having inlet opening 31, outlet opening 32, and valve seat 33 each defined therein. Moveable valve member 34 is slidably disposed in axial bore 35 of valve housing 30. An O-ring seals valve member 34 to bore 35. One end of valve member 34 has attached thereto seal 36 which is engageable with valve seat 33. The opposite end of valve member 34 contains threaded stem 37. Stepper motor 60 has a housing which is attached to housing 30 of valve 20. Motor 60 also includes a shaft 62 having threaded connection 38 affixed thereto, with threaded connection 38 being disposed in threaded engagement with threaded stem 37 of valve member 34.

Figure 7:
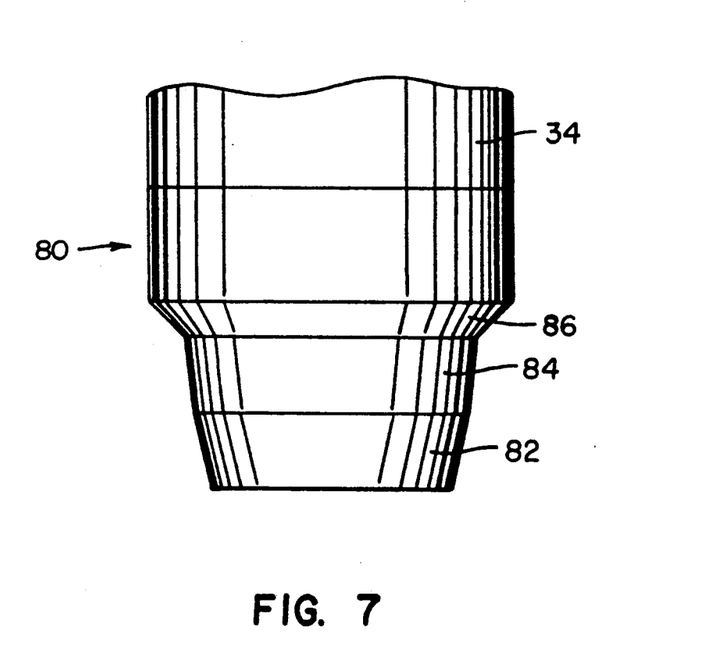
FIG. 7 is a side elevation view of one embodiment of the valve seal of the present invention.

Valve seal 36 may be comprised of either rigid or flexible material, and is preferably further disposed in a shape which provides a precise metering valve with very high resolution. One preferred embodiment is schematically illustrated in FIG. 7. The seal shown is a combination of a standard poppet valve configuration and that of a needle valve. Seal 80 is disposed so that outer surfaces 82, 84, and 86 are each formed at a different angle to the central axis of seal 80. The diameters of outer surfaces 82, 84 and 86 each increase as the distance decreases between the associated outer surface portion of seal 80 and the threaded end of valve member 34. As shown in FIG. 7, the rate of increase of the diameter of the outer surface of seal 80 is a function of the distance along the central axis thereof.

Connected to stepper motor shaft 62 is manual override knob 63. Knob 63 provides for manual rotation of stepper motor shaft 62, thereby allowing the hot and cold valves to be manually operated either in conjunction with the automatic control system or as an alternative thereto. Manual operation of the valves may be necessary or desirable in such events as a power outage, or in cases where the fluid control system is to be used as an ordinary valve system with direct readout of the mixed fluid temperature, or in cases where it is desirable to manually adjust the hot and cold valves even when the temperature control system is operating.

Each stepper motor 60 is of the type having a permanent magnet and multiple coils which can be energized in specific order to make shaft 62 rotate step wise, in either a clockwise or counterclockwise direction. Conventional stepper motors are available which operate quickly and which maintain the selected position with a high amount of holding torque. The stepper motor size and number of step increments chosen for a particular application depend upon the torque requirements and on the fineness of rotational control required for that particular application. As an example, stepper motor 60 may comprise a 12 volt DC unipolar AIRPAX brand stepper motor which produces a holding torque of 55 oz. in. and has a rotational resolution of 200 steps per revolution. While the embodiment of the invention illustrated herein uses stepper motors to drive the valves, it should be understood that other drive mechanisms could also be employed, such as, for example, servo motors and DC motors.

For the type of threaded engagement between valve member 34 and stepper motor shaft 62 shown in FIG. 2, valve member 34 is restrained from rotational movement with respect to bore 35 by an appropriate mechanism such as, for example, a keyway or a cam and groove arrangement. Hence, rotation of shaft 62 causes valve member 34 to move either closer to or further away from valve seat 33. In an alternative embodiment to that shown in FIG. 2, motor shaft 62 itself may be threaded with a male thread pattern, and valve member 34 may include a female thread pattern along the central axis thereof, which female threads of valve member 34 engage the male threads of shaft 62.

Figure 4:
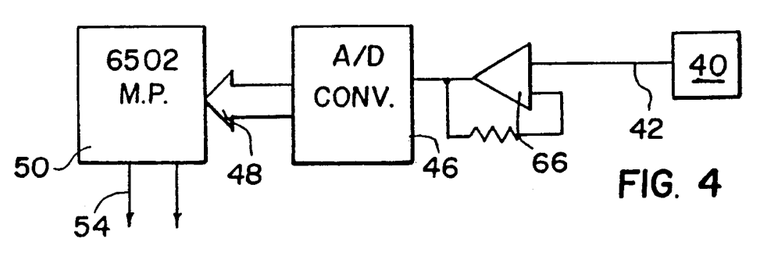
FIG. 4 schematically illustrates one manner in which a temperature signal may be generated and utilized in the present invention to form a control signal for the stepper motors.

Referring now to FIG. 4, schematically represented therein is one embodiment of a temperature signal generating means which may be employed for the control system of FIG. 1. Although temperature sensor 40 may comprise any device capable of producing a compatible signal, a two wire thermocouple is preferred because of its fast response to a temperature change. When sensor 40 comprises a thermocouple, a voltage is developed which is proportional to the temperature difference between the ends of the two special metal alloys which are connected together to form the thermocouple. This voltage is supplied over line 42 to a conditioning and amplifying circuit. The voltage available from thermocouples is typically not sufficient to drive analog-to-digital converter 46, so that amplifier 66 is desirable to provide a compatible temperature signal to converter 46. Besides having low voltage outputs which require amplification, thermocouples also require a reference temperature to which the change in temperature being measured can be compared. Circuitry is conventionally available which simulates a reference junction which is submerged in a bath of ice water. Such circuitry is referred to as a cold reference junction compensator circuit. As an example of a thermocouple circuit which may be employed in the present invention, temperature sensor 40 may comprise a FLUKE TK 80 brand thermocouple module which provides temperature readout in a scale of ten millivolts per degree. This device includes the cold reference junction compensator circuit described above. To amplify the ten millivolt per degree output of the thermocouple to a level useable by converter 46, the signal on line 42 is amplified using quad op amp 66. Another thermocouple module which may be used in the invention is the model AD 595 module available from Analog Devices of Norwood, Mass.

Converter 46 transforms the output signal from op amp 66 into a digital signal, for example, an 8 bit digital number. The reference voltage range utilized for converter 46 may be chosen in any appropriate manner. In one embodiment, the reference voltage range is adjusted so that a temperature of 60 degrees Fahrenheit produces the digital number 0, and a temperature of 125 degrees produces the digital number 255. The digital number generated by converter 46 is supplied over line 48 to microprocessor 50, where it is compared to the selected temperature signal in order to generate a feedback control signal.

Figure 3:
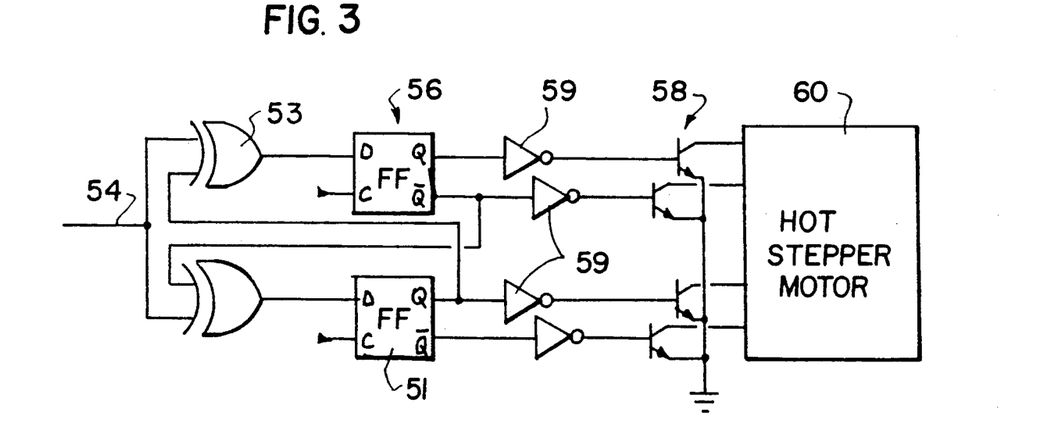
FIG. 3 is a schematic representation of one embodiment of a circuit which may be employed for driving the stepper motors of the present invention.

FIG. 3 schematically illustrates one embodiment of a logic circuit for driving the stepper motors, in accordance with the present invention. The circuit shown applies feedback control signals received from microprocessor 50 over line 54 to power transistors 58 which are connected to power the various coils of stepper motor 60, in a correct sequence to produce the required incremental rotation. Although FIG. 3 illustrates only the circuitry for the hot stepper motor, that for the cold stepper motor is identical. Logic circuit 56 comprises at least two flip-flops 51 for each stepper motor 60, with each flip-flop having an inverting and a non-inverting output and a plurality of power transistors 58 disposed so that each output of each of flip-flops 51 is connected to the appropriate stepper motor by one of transistors 58. In the embodiment shown in FIG. 3, each flip-flop output is connected through an associated inverter 59 to the base of the transistor 58 which connects the flip-flop output to stepper motor 60. A control input of each flip-flop is connected to the output of an associated exclusive OR gate of its own. Each exclusive OR gate 53 has one input connected to the control signal on line 54 and another input connected to either the inverting or the non-inverting output of one of flip-flops 51. With the logic circuit configured in this manner, predetermined ones of transistors 58 are selectively powered in response to corresponding control signals from microprocessor 50. It should be noted that the functions of the above circuit can also be provided by microprocessor 50 rather than by physical electronic components.

Although not shown in the Figures, the fluid system of the present invention may also comprise means for displaying the actual temperature of the mixed fluid discharged from outlet connection 18. The display means may be further configured so that other parameters may also be displayed, such as, for example, the selected set point temperature, the selected flow rate, and various other data associated with the control functions provided by the digital processing means. The display means may be configured as a single, time-shared display for presenting the various pieces of data, or several separate, dedicated displays, or combinations thereof. Preferably, the display is configured so that it can be turned off for those applications where light sources are undesirable, such as, for example, in photographic processing.

A variety of digital processing means may be utilized in the present invention. By way of example and not limitation, microprocessor 50 shown in FIG. 1 may comprise a 6502 microprocessor which is found in the SYM (a trade name) microcomputer experimentation unit and also in the APPLE IIe (a trade name) computer. When this type of microprocessor is employed, a personal computer such as the APPLE IIe may be utilized as a software development system for the microprocessor program. The programmer can enter assembly language mnemonics into the computer using an editor program. An assembler program in the computer converts the assembly language mnemonics into machine language code for the microprocessor. The machine language code is then transferred from the memory of the personal computer to the microprocessor via an RS-232C interface by a transfer program in the personal computer. Once the microprocessor software has been developed, it can be permanently stored in non-volatile eraseable programmable read only memories (EPROM's). A number of personal computers now have the capability of transferring the software to the appropriate EPROM. Typically, an EPROM programmer card is installed in the personal computer and software within the computer "burns in" the microprocessor program into the EPROM. The programmed EPROM is then installed directly into the circuit board containing the microprocessor. Where large numbers of units are involved, such as in mass production, the EPROM method of installing software is usually replaced by read only memories (ROM's).

Figure 5:
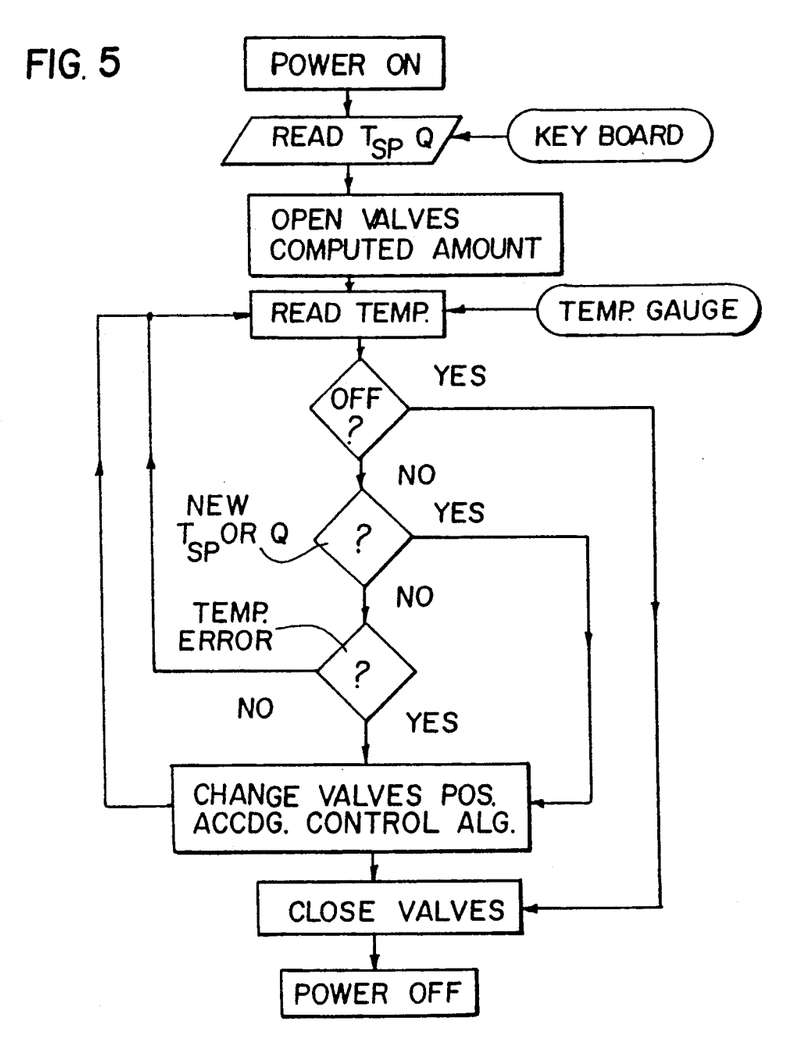
FIG. 5 is a flow chart illustrating the basic operational principles of the invention.

U.S. Pat. No. 4,931,938, issued June 5, 1990 to the present inventor, contains a printout of a microprocessor control program in accordance with the present invention. The printout listing includes assembly language mnemonics and machine language code. To facilitate writing, editing, and testing, the program is structured as a list of subroutines. The aforementioned patent also includes a list of the subroutines used and a short description of the purpose of each. FIG. 5 of the instant application illustrates a flow chart of the operation of the control program. The program listing, the listing of the subroutines used, and the related descriptions contained in U.S. Pat. No. 4,931,938 are hereby incorporated herein by reference.

That same patent also describes some of the testing that has been conducted for the inventive fluid system, as well as the results thereof. Those results and the description of the related testing are also incorporated herein by reference.

When the inventive system incorporates a microcomputer as the digital processing means, a wide variety of accessory functions can be included in the system. For example, the system may further comprise means for selecting a predetermined shutoff time for the fluid flow, and for closing the hot and cold fluid valves upon the occurrence of the shutoff time. With this type of built-in timer, unattended operation of the system is enhanced. Various time-temperature-flow patterns can also be easily programmed. For example, the rehabilitative procedure described hereinabove could be followed. The digital processing means may be further configured so that the hot and cold valves are closed when the actual temperature of the mixed fluid cannot be maintained within a predetermined limit of the selected set point temperature. Such a safety feature would insure that the particular process involved would be discontinued rather than suffering catastrophic results when the fluid temperature cannot be controlled. Other features that could be included in the system are automatic shutoff of the system after a predetermined volume of fluid has been discharged, and control of the system by voice recognition and speech synthesis circuits.

Keypad 51 provides a means for selecting a desired temperature for the fluid mixture. It may also be used to select a desired flow rate for the mixed fluid, to turn the system on and off, and to provide other user communication with microprocessor 50.

The foregoing describes a temperature controlled fluid system which automatically maintains the temperature of the fluid mixture discharged from the system at a preselected value. The control system accurately and rapidly adjusts the flow rates of the hot and cold fluids into the system so as to maintain the fluid temperature within a very close tolerance of the desired temperature. The feedback algorithm employed in the system can be easily adjusted by merely changing the software for the digital processor. The fluid system of the present invention is comprised of off-the-shelf components which are reliable, rugged, and economical.

While the invention has been described in detail herein in accord with certain preferred embodiments thereof, many modifications and changes therein may be effected by those skilled in the art. Accordingly, it is intended by the appended claims to cover all such modifications and changes as fall within the true spirit and scope of the invention.

The invention claimed is:

1. A temperature controlled fluid system, comprising:
   a hot fluid supply connection, for supplying hot fluid to said system;
   a cold fluid supply connection, for supplying cold fluid to said system;
   hot and cold fluid valves connected, respectively, to said hot and cold fluid supply connections, said hot and cold valves each having a valve seat and a valve member movable with respect to said valve seat to control a flow of fluid through said valve;
   first and second valve motors connected, respectively, to said hot and cold fluid valves for moving said hot and cold valve members, respectively, in relationship to their associated valve seats;
   means, connected to said hot and cold fluid valves, for receiving the flow of hot and cold fluids from said valves and mixing said fluids together into a fluid mixture having a substantially uniform temperature for all radial locations within a given cross section of the mixed fluid flow;
   an outlet connection connected to said mixing means, for discharging said mixed fluid from said system;
   means for generating an electrical signal corresponding to the actual temperature of the mixed fluid discharged from said outlet connection;
   digital processing means connected to said temperature signal generating means, for computing an error value between the actual temperature of said mixed fluid and a selected temperature therefor, and also for applying a digitally implemented feedback control algorithm to said error value so as to generate a feedback control signal for controlling the fluid flow through said hot and cold valves; and
   logic means connected to said digital processing means and also to said first and second valve motors, for receiving said feedback control signal and for controlling said valve motors in response to said control signal, to move said hot and cold valve members so as to cause the actual temperature of the mixed fluid to approach the selected temperature therefor.

2. The system of claim 1 wherein said mixing means comprises means for directing the flow of said hot and cold fluids so as to blend said fluids into a substantially homogeneous mixture.

3. The system of claim 2 wherein said fluid directing means comprises one or more stationary mixer elements disposed in the flow path of said hot and cold fluids.

4. The system of claim 3 wherein said mixer elements are generally helically shaped.

5. The system of claim 4 wherein a plurality of said mixer elements are disposed end-to-end in a pipe which connects said hot and cold fluid valves to said outlet connection.

6. The system of claim 5 wherein said mixer elements are further disposed so that the helices formed by adjoining mixer elements are oriented in opposite rotational directions.

7. The system of claim 1 wherein said mixing means is further disposed so that the flow path lengths of said hot and cold fluids, between the locations of said hot and cold valves, respectively, and the location of said outlet connection, are substantially equal.

8. The system of claim 1 wherein said temperature signal generating means comprises:
   a temperature sensor connected to said outlet connection, for generating an analog signal corresponding to the actual temperature of the mixed fluid in said outlet connection; and
   analog-to-digital conversion means connected to said temperature sensor for converting said analog signal into a digital temperature signal corresponding to the actual temperature of said mixed fluid.

9. The system of claim 8 wherein said temperature sensor comprises a two wire thermocouple.

10. The system of claim 1 further comprising input means connected to said digital processing means, for selecting a desired temperature for the mixed fluid discharged from said outlet connection and for generating a selected temperature signal corresponding to said selected temperature.

11. The system of claim 10 wherein said input means further includes means for selecting a desired flow rate for the mixed fluid discharged from said outlet connection.

12. The system of claim 10 wherein said digital processing means and said input means are further disposed so that the feedback coefficients for said feedback control algorithm are adjustable via said input means.

13. The system of claim 1 wherein said valve member of each of said hot and cold fluid valves is further disposed so that one of its ends is threaded and so that the opposite end thereof has attached thereto a seal which is engageable with said associated valve seat, and wherein each said valve motor comprises a stepper motor having a shaft and a threaded connection fixed to said shaft, with said threaded connection being disposed in threaded engagement with said threaded end of the associated valve member.

14. The system of claim 13 wherein each said valve seal is further disposed so that the diameter of the outer surface thereof increases as the distance decreases between said outer surface portion and the threaded end of said valve member, with the rate of increase of said diameter being a function of said distance.

15. The system of claim 13 wherein each said stepper motor shaft has a knob connected thereto for manual rotation of said shaft.

16. The system of claim 1 wherein said valve motor comprises a stepper motor, and wherein said logic means comprises at least two flip-flops for each stepper motor, with each flip-flop having an inverting and a non-inverting output, said logic means also including a plurality of power transistors disposed so that each output of each flip-flop is connected to one of said stepper motors by one of said transistors.

17. The system of claim 16 wherein each said flip-flop output is connected through an associated inverter to the base of said transistor which connects said flip-flop output to said stepper motor, and wherein a control input of each said flip-flop is connected to the output of an associated exclusive OR gate, with one input of each said exclusive OR gate being connected to said control signal from said digital processing means and the other input of said exclusive OR gate being connected to one of the inverting or non-inverting outputs of said flip-flops, so as to selectively power predetermined ones of said transistors in response to corresponding control signals from said digital processing means.

18. The system of claim 1 wherein said digital processing means is programmed to digitally implement a proportional plus integral type of feedback control algorithm satisfying the equation $$M = Kp\,(E + Ki\Sigma_0^N E)$$

where M is the feedback signal, E is the measured temperature error, and Kp and Ki are feedback constants.

19. The system of claim 18 wherein Kp is the selected temperature divided by 100, and Ki is the selected temperature divided by the flow rate of the mixed fluid.

20. The system of claim 1 further comprising means for displaying the actual temperature of the mixed fluid discharged from said outlet connection.

21. The system of claim 1 further comprising means for monitoring the difference between the actual temperature of said mixed fluid and the selected temperature therefor, and for adjusting the feedback coefficients for said control algorithm so as to minimize said difference and thereby optimize the system's performance.

22. The system of claim 1 further comprising means for selecting a predetermined shutoff time for said fluid flow and for closing said hot and cold fluid valves upon the occurrence of said shutoff time.

23. The system of claim 1 wherein said digital processing means is further configured so that said hot and cold fluid valves are closed when the actual temperature of said mixed fluid cannot be maintained within a predetermined limit of the selected temperature of said mixed fluid.

24. The system of claim 1 wherein said digital processing means comprises a microcomputer.

25. A temperature controlled fluid system, comprising:
 a hot fluid valve and a cold fluid valve, each valve having a valve seat and a valve member movable with respect to said valve seat to control a flow of fluid through said valve, with each said valve member being further disposed so that one of its ends is threaded and so that the opposite end thereof has attached thereto a seal which is engageable with said associated valve seat;
 a hot fluid supply connection connected to said hot fluid valve for supplying hot fluid thereto;
 a cold fluid supply connection connected to said cold fluid valve for supplying cold fluid thereto;
 a first stepper motor connected to said hot fluid valve and a second stepper motor connected to said cold fluid valve, for moving said hot and cold valve members, respectively, in relationship to their associated valve seats, said stepper motors each having a shaft and a threaded connection fixed to said shaft, with said threaded connection being disposed in threaded engagement with said threaded end of said valve member so that rotational movement of said stepper motor shaft produces movement of said associated valve member in a direction along the longitudinal axis of said member;
 an outlet connection connected to and located between said hot and cold fluid valves, for receiving the flow of hot and cold fluids and discharging them as a mixed flow of fluid;
 a temperature sensor connected to said outlet connection for generating an electrical signal corresponding to the actual temperature of the discharged fluid;
 a microcomputer connected to said temperature sensor for computing an error value between the actual temperature of the discharged fluid and a selected temperature therefor, and for applying a digitally implemented feedback control algorithm to said error value to generate a feedback control signal for controlling the fluid flow through said hot and cold valves; and
 logic means connected to said microcomputer and also to said first and second stepper motors, for receiving said control signal and for controlling said stepper motors in response to said control signal, to move said hot and cold valve members so as to cause the actual temperature of the mixed fluid to approach the selected temperature therfor.

26. The system of claim 25 wherein said outlet connection is further disposed so that the flow path lengths of said hot and cold fluids, between the locations of said hot and cold valves, respectively, and the location where the mixed flow of fluid is discharged, are substantially equal.

27. The system of claim 25 wherein said logic means comprises at least two flip-flops for each stepper motor, with each flip-flop having an inverting and a non-inverting output, and a plurality of power transistors disposed so that each output of each flip-flop is connected to one of said stepper motors by one of said transistors.

28. The system of claim 27 wherein each said flip-flop output is connected through an associated inverter to the base of said transistor which connects said flip-flop output to said stepper motor, and wherein a control input of each said flip-flop is connected to the output of an associated exclusive OR gate, with one input of each said exclusive OR gate being connected to said control signal from said microcomputer and the other input of said exclusive OR gate being connected to one of the inverting or non-inverting outputs of said flip-flops, so as to selectively power predetermined ones of said transistors in response to corresponding control signals from said microcomputer.

29. The system of claim 25 wherein said microcomputer is programmed to digitally implement a proportional plus integral type of feedback control algorithm.

30. The system of claim 25 further comprising keyboard means connected to said microcomputer, for entering a selected value for the desired temperature of the discharged fluid and for generating a selected temperature signal corresponding to the value of the selected temperature.

* * * * *